Jan. 7, 1930.   E. A. EUSTICE   1,742,903
HAND ADJUSTMENT FOR LAWN MOWER CUTTER BARS
Filed Sept. 20, 1928
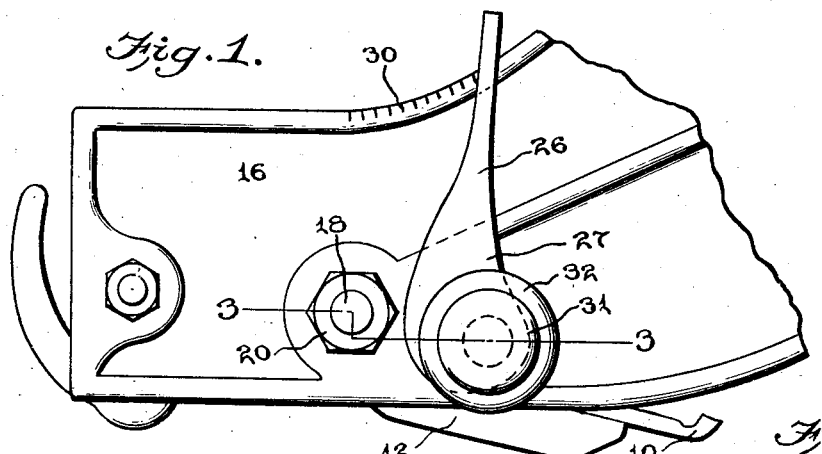
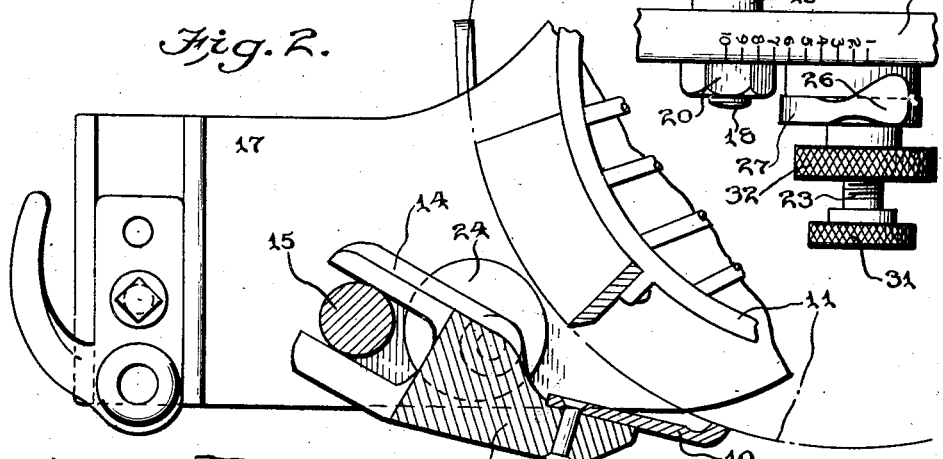
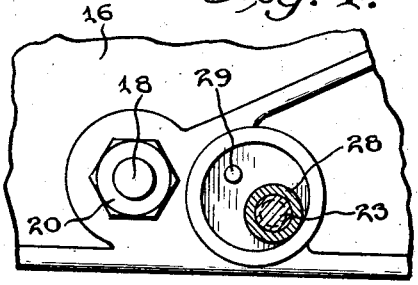
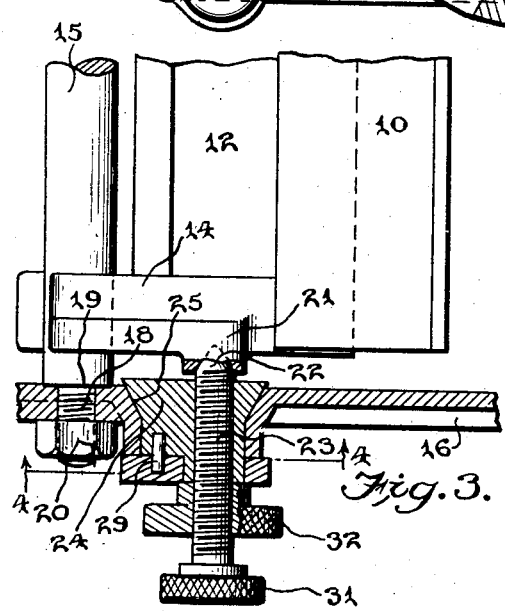
Inventor
E. A. Eustice,
By
Attorney Patented Jan. 7, 1930

1,742,903

UNITED STATES PATENT OFFICE

EDWARD A. EUSTICE, OF GALESBURG, ILLINOIS

HAND ADJUSTMENT FOR LAWN-MOWER-CUTTER BARS

Application filed September 20, 1928. Serial No. 307,163.

The object of the invention is to provide a means for application to machine for effecting micrometer adjustments by hand and without the use of any tools, and particularly a means for effecting nice adjustments of the cutter bar of a law mower with respect to the reel thereof; to provide a cutter bar adjustment which makes possible the independent adjustment of the bar at opposite sides of the lawn mower, so that the former may be readily positioned properly with respect to the reel throughout the length of the two; and to provide an adjusting device of simple form and therefore susceptible of cheap manufacture and low marketing cost.

With this object in view the invention consists in a construction and combination of parts of which a preferred embodiment is illustrated in the accompanying drawings, wherein:

Figure 1 is a side elevational view of a side plate of a lawn mower, showing the invention applied.

Figure 2 is a view partly in section and partly in elevation looking in the inner face of the opposite or companion side plate.

Figure 3 is a sectional view on the plane indicated by the line 3—3 of Figure 1.

Figure 4 is a sectional view on the plane indicated by the line 4—4 of Figure 3.

Figure 5 is a plan view of a portion of the upper edge of the side plate shown in Figure 1.

The cutter bar 10 which, by means of the invention, is adjustable with a nicety toward and away from the reel 11, is carried on a rocker frame 12, the latter being provided with rearwardly extending space forks 14 straddling a tie bar 15 which spans the side plates 16 and 17. The tie bar is provided with reduced threaded terminals 18 which leave shoulders 19 abutting the inner faces of the side plates, the threaded terminals passing through the side plates and receiving the nuts 20 bearing against the outer faces of the side plates.

The rocker frame 12 at opposite ends is formed with counter sinks 21 in which the conical ends 22 of the screws 23 set, the latter being threadingly mounted in rotary heads 24 mounted for angular or turning movement in the side plates. The axes of the screws 23 are eccentric to the axes of the heads and the latter while cylindrical for a portion of their length are formed with conical heel portions 25, the mounting holes in the side plates being counter sunk from the inside to provide seats for the conical portions.

Provision is made for effecting angular or turning movement of the heads and this comprises levers 26 enlarged at their lower ends as indicated at 27, and formed with sides which are entered by bosses 28 formed on the rotary heads concentric with the screws 23. Pins 29 carried by the heads enter holes formed in the enlargements 27 of the levers and the latter are thus connected to the heads at spaced points, so that rocking of the levers will impart angular or turning movement to the heads, angular or turning movement of the latter through the instrumentality of the levers 26 will move the cutter bar 10 toward or away from the reel 11 by reason of the tie bar 15, which is fixed and straddled by the forks 14, acting as the pivotal axis around which the rocker frame swings.

The upper edges of the side plates 16 and 17 are formed with graduations 30 identified with markings indicating micrometer movements of the cutter bar as the upper ends of the levers are moved past them. Since there is an adjustment of this kind on each side plate, the arrangement provides for the micrometer adjustment of the cutter bar at each side of the mower, so that it may be positioned with a nicety with respect to the reel.

The screws 23 are provided with knurled heads 31 and they also carry between these heads and the levers the lock nuts 32 which are likewise knurled to permit turning by hand. With the lock nuts 32 loose, the screws 23 may be adjusted to effect the best seating arrangement in the rocker frame and the levers may be readily swung to impart the necessary rocking movement to the frame to adjust the cutter bar. When the proper positioning of the latter has been obtained, the tightening of the lock nuts 32, not only prevents any recession or change in the previous adjustment of the screws 23, but also lock the rotary heads in position, since the lock nuts bear upon the enlargements of the levers and these enlargements bear upon the side plates, thus drawing the heel portions of the rotary heads snugly into the counter swung portions of the holes in the side plates.

The invention having been described what is claimed as new and useful is:

1. A micrometer adjustment of the kind indicated consisting of a rocker movable circumferentially and radially of a fixed member, a rotary head with which the rocker has a pivotal connection eccentrically of the former, and means for imparting angular turning movement to said rotary head.

2. A micrometer adjustment of the kind indicated consisting of a rocker movable circumferentially and radially of a fixed member, a rotary head with which the rocker has a pivotal connection eccentrically of the former, a scale and a lever carried by the rotary head with its terminal movable across the scale which is graduated to indicate micrometer movement of the pivotal connection between the rocker and the rotary head.

3. A micrometer adjustment of the kind indicated consisting of a rocker movable circumferentially and radially of a fixed member, a rotary head with which the rocker has a pivotal connection eccentrically of the former, means carried by the rotary head for imparting angular or turning movement thereto, and means for locking the heads against such movement.

4. An adjustment of the kind indicated consisting of a side plate, a bar fixed in said side plate, a rotary head mounted for angular or turning movement in said side plate, a rocker frame having a fork straddling said bar and a pivotal connection with the rotary head eccentric of the latter, and a lever carried by the rotary head for imparting angular or turning movement to the same.

5. An adjustment of the kind indicated consisting of a side plate, a bar fixed in said side plate, a rotary head mounted for angular or turning movement in said side plate, a rocker frame having a fork straddling said bar and a pivotal connection with the rotary head eccentric of the latter, the rotary head having a conical heel portion engaging a counter sink in the side plate, a lever carried by the rotary head for imparting angular or turning movement to the same, the lever overlapping the side plate, and a lock nut carried by the rotary head and bearing against the lever to force the latter into contact with the side plate and firmly seat the conical portion of the head in the countersink.

6. An adjustment of the kind indicated consisting of a side plate, a bar fixed in said side plate, a rotary head mounted for angular or turning movement in said side plate, a rocker frame having a fork straddling said bar and a pivotal connection with the rotary head eccentric of the latter, the rotary head having a conical heel portion engaging a counter sink in the side plate, a lever carried by the rotary head for imparting angular or turning movement to the same, the lever overlapping the side plate, and a lock nut carried by the rotary head and bearing against the lever to force the latter into contact with the side plate and firmly seat the conical portion of the head in the countersink, the pivotal connection between the rocker frame and the rotary head consisting of a screw threadingly engaged in the latter and formed with the conical terminals seated in the rocker frame, said lock nut being carried by said screw.

In testimony whereof he affixes his signature.

EDWARD A. EUSTICE.